A. Y. EDWARDS.
ADJUSTABLE BEARING FOR SHAFTS.
APPLICATION FILED NOV. 5, 1908.
1,001,003.
Patented Aug. 22, 1911.
2 SHEETS—SHEET 1.
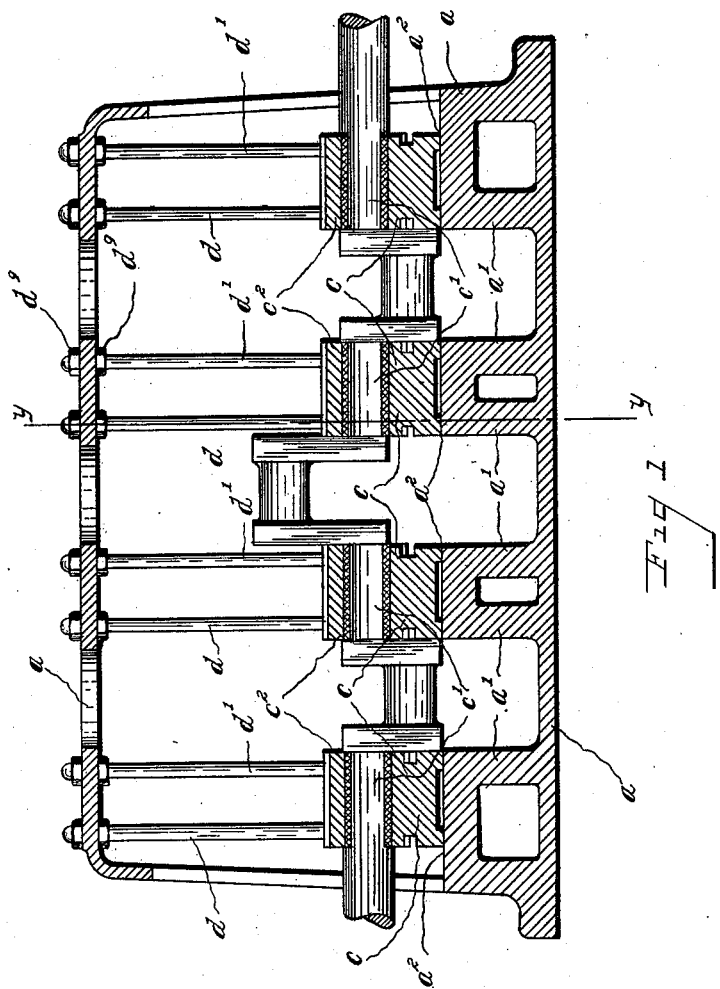
Witnesses
Oliver T. Clarke.
Chas. J. Welch.
Inventor.
Albert Y. Edwards.
Attorneys

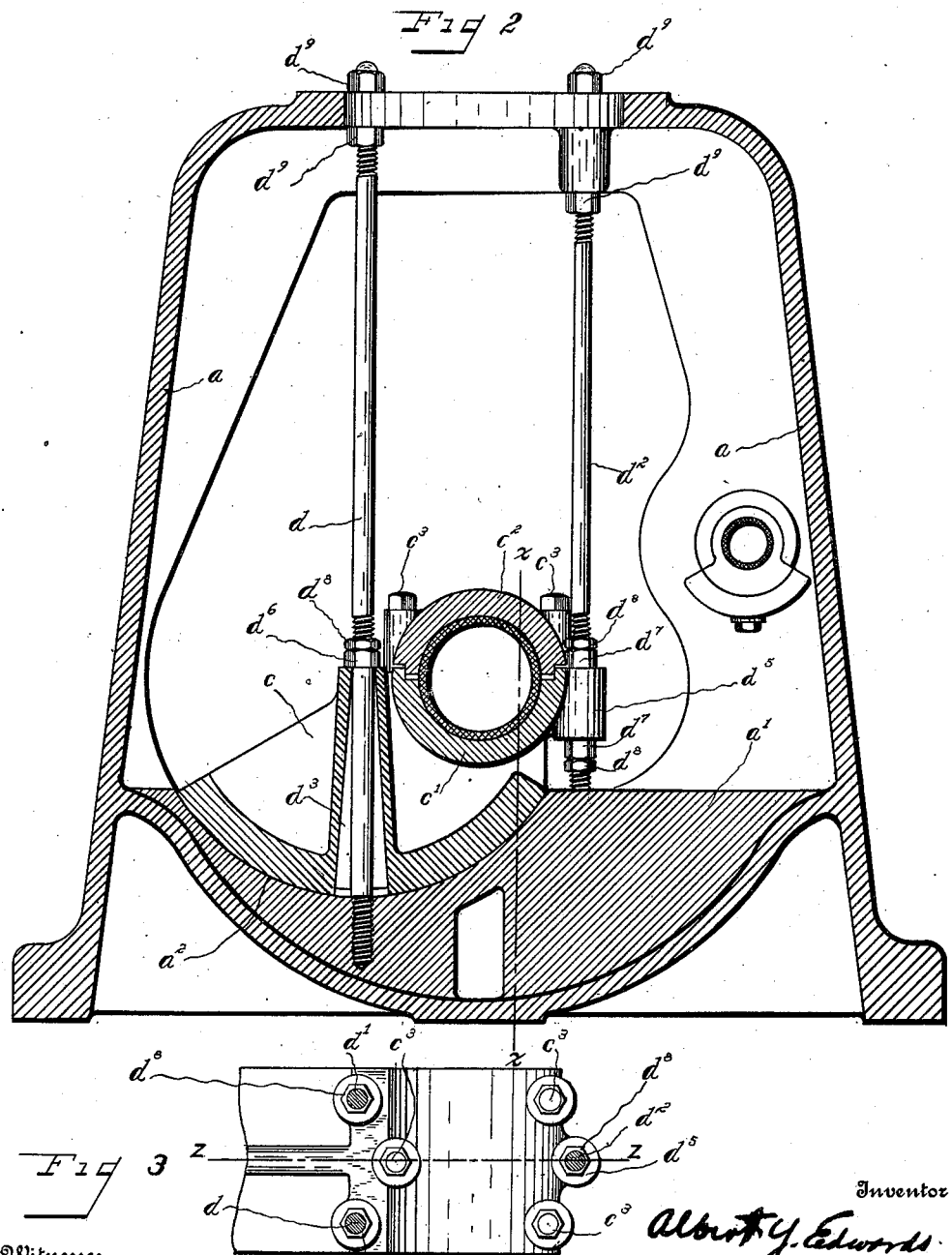

UNITED STATES PATENT OFFICE.

ALBERT Y. EDWARDS, OF SPRINGFIELD, OHIO, ASSIGNOR TO THE FOOS GAS ENGINE COMPANY, OF SPRINGFIELD, OHIO, A CORPORATION OF OHIO.

ADJUSTABLE BEARING FOR SHAFTS.

1,001,003. Specification of Letters Patent. Patented Aug. 22, 1911.

Application filed November 5, 1908. Serial No. 461,225.

*To all whom it may concern:*

Be it known that I, ALBERT Y. EDWARDS, a citizen of the United States, residing at Springfield, in the county of Clark and State of Ohio, have invented certain new and useful Improvements in Adjustable Bearings for Shafts, of which the following is a specification.

This invention relates to improvements in adjustable bearings for shafts and particularly to that type of adjustable bearing in which the bearing-block or box is located in a curved seat with the center or axis of the bearing proper arranged eccentrically to the curvature of the seat.

The bearing is especially designed for the crank shaft of explosive engines but it may be employed in other lines of machines.

An object of the invention is to simplify the construction and make more effective the operation of bearings of this kind, as well as cheapen the manufacture.

The invention consists in the constructions and combinations of parts hereinafter described and set forth in the claims.

In the accompanying drawings, Figure 1 is a longitudinal sectional view through the bed of an engine and the several bearings, the section being taken on the line $x$ $x$ of Fig. 2. Fig. 2 is a vertical sectional view of the same, the section being on the line $y$ $y$ of Fig. 1. Fig. 3 is a top plan view of one of the bearings, some of the parts being shown in section.

Like parts are represented by similar characters of reference in the several views.

In the said drawings, $a$ $a$ represents the bed or frame of an ordinary explosive engine, constructed in the usual way to support the cylinders and operating parts. Extending transversely across the bottom of the frame or bed are a series of supporting webs, $a^1$, for the bearings of the crank-shaft, $b$, any number of which may be employed, it being usual to provide a bearing for the shaft on opposite sides of each crank. Each of the webs is provided with a curved seat, $a^2$, and seated in these curved seats are the bearing-blocks, $c$ $c$, each of said blocks being correspondingly curved on its under side; the bearing proper, $c^1$, for the shaft, being located at one side of the center of the block, as hereinafter more fully described. The curved seat $a^2$, is preferably formed on the arc of a circle struck from a center located at a point substantially at the top of the block, $c$, and in the present instance, about midway its width, and the center of axis of the bearing proper is on or very close to a horizontal line therewith but located well toward the side of the block so as to have the center of axis of the bearing proper as far removed from the center of the arc of the curved seat as practicable.

Each of the blocks is adapted to be secured in any position of adjustment in its curved seat by means of the rods, $d$, $d^1$ $d^2$, which are secured at their upper ends to the top of the bed or frame and at their lower ends to the web, $a^1$, the preferable manner of securing them being by screwing their lower ends into the web, as shown, and locking them to the frame at their upper ends by the nuts, $d^3$, the upper ends of the rods being screw-threaded for this purpose. Each of the blocks is provided with two vertical tapered openings $d^3$ to receive the rods, $d$ and $d^1$, and with a perforated boss, $d^5$, to receive the rod $d^2$; said openings being located on a line with each other at opposite ends of the block and substantially at the center of the width of the block, and said boss being extended laterally from that side of the block on which the bearing proper, $c^1$, is located.

Nuts, $d^6$, located on screw-threaded portions of the rods, $d$ $d^1$, are screwed tightly against the top of the block, and nuts $d^7$ $d^7$, screw-threaded on the rod $d^2$ above and below the boss $d^5$, are turned tightly against the said boss, thus firmly clamping the block in its position in its seat; lock-nuts, $d^8$, being preferably provided to keep the nuts $d^6$ and $d^7$ from working loose. If it is desired to adjust the bearing-block in its seat, the nuts $d^6$ are first loosened, when, by turning the nuts $d^7$ $d^7$ up or down, as the case may be, the bearing block will be slid in either direction in its curved seat and thus raise or lower the bearing proper, $c^1$, and consequently the shaft. It should be stated that the openings, $d^3$, in the block are tapered with their widest parts at the bottom so that the rods $d$ and $d^1$ will not interfere with the movement of the block, the respective openings at the top fitting the rod rather snugly so that the block in moving will swing about a center at this point, and it is at substantially this point that the arcs of the circles, forming the curved seats $a^2$ and the lower portion of the bearing block, are struck. By having the center or axis of the bearing proper on or very close to a horizontal line with the center from which the arc forming the curved seat is struck, the movement of the bearing proper from a straight line is very slight.

Having thus described my invention, I claim:

1. In an adjustable bearing, a main support having a curved seat, a bearing block having a curved surface located in said seat, a rod secured to said main support and extending through an opening in said block, together with means on said rod for clamping said block to said seat, said opening being of a size to permit of a movement of said block with respect to said rod, the curved surfaces of said seat and block being formed on the arc of a circle whose center is substantially on said rod near the top of said opening to permit said block to swing about the same in its seat, a shaft bearing in said block whose center or axis is removed from said arc center, and means for adjusting the position of said block in said seat and holding same in its adjusted position, substantially as specified.

2. In an adjustable bearing, a main support having a curved seat, a bearing block having a curved surface located in said seat, a rod secured to said main support and extending through a tapered opening in said block, together with means on said rod for clamping said block to said seat, the curved surfaces of said seat and block being formed on the arc of a circle whose center is substantially on said rod near the top of said tapered opening to permit said block to swing about the same in its seat, a shaft bearing in said block whose center or axis is removed from said arc center, and means for adjusting the position of said block in said seat and holding same in its adjusted position, substantially as specified.

3. In an adjustable bearing, a main support having a curved seat, a bearing-block having a curved surface located in said seat, a rod secured to said main support and extending through a tapered opening in said block the walls of which lie close to said rod at the top of said block, the curved surfaces of said seat and block being formed on the arc of a circle whose center is substantially on said rod at the top of said block, a shaft bearing located in said block at a point removed from said center, a rod secured to said support and extending through an opening in said block on the opposite side of said bearing from said arc center, and means on both of said rods for adjustably securing said block on said seat, substantially as specified.

In testimony whereof, I have hereunto set my hand this 5th day of October, 1908.

ALBERT Y. EDWARDS.

Witnesses:
 CHAS. I. WELCH,
 OLIVER T. CLARKE.

---

Copies of this patent may be obtained for five cents each, by addressing the "Commissioner of Patents, Washington, D. C."